United States Patent

Chow

[15] 3,689,751

[45] Sept. 5, 1972

[54] SINGLE WALL DOMAIN LOGIC ARRANGEMENT

[72] Inventor: Woo Foung Chow, Berkeley Heights, N.J.

[73] Assignee: Bell Telephone Laboratories, Incorporated, Murray Hill, N.J.

[22] Filed: Nov. 2, 1970

[21] Appl. No.: 86,248

[52] U.S. Cl..............................235/176, 340/174 TF

[51] Int. Cl............................G06f 7/50, G11c 11/14

[58] Field of Search................235/176; 340/174 TF; 307/88 LC, 88 TF

[56] References Cited

UNITED STATES PATENTS

| | | | |
|---|---|---|---|
| 3,530,446 | 9/1970 | Perneski | 340/174 |
| 3,518,643 | 6/1970 | Perneski | 340/174 |
| 3,534,347 | 10/1970 | Bobeck | 340/174 |
| 3,541,522 | 11/1970 | Bobeck | 340/172.5 |
| 3,541,535 | 11/1970 | Perneski | 340/174 |
| 3,543,252 | 11/1970 | Perneski | 340/174 |
| 3,618,054 | 11/1971 | Bonyhard | 340/174 TF |
| 3,619,636 | 11/1971 | Chow | 307/88 TF |

*Primary Examiner*—Malcolm A. Morrison
*Assistant Examiner*—David H. Malzahn
*Attorney*—R. J. Guenther and Kenneth B. Hamlin

[57] ABSTRACT

A serial full adder is defined by a magnetically soft overlay pattern in a slice of magnetic material in which single wall domains can be moved. The overlay defines a unique intersection between two input and one output domain propagation channels which carries out the carry function in response to the reorienting in-plane field which effects domain movement in the channels.

8 Claims, 17 Drawing Figures

INVENTOR
W. F. CHOW
BY Herbert M. Shapiro
ATTORNEY

SINGLE WALL DOMAIN LOGIC ARRANGEMENT

FIELD OF THE INVENTION

This invention relates to data processing arrangements, particularly arrangements which capitalize on the capabilities of single wall magnetic domain devices for their realization.

BACKGROUND OF THE INVENTION

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields for moving domains are often provided by an array of conductors pulsed individually by external drivers. The shape of the conductors is dictated by the shape of the domain and by the material parameters. Most materials suitable for the movement of single wall domains exhibit a preferred direction of magnetization normal to the plane of movement and are magnetically isotropic in the plane. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in such a manner is disclosed in U.S. Pat. No. 3,460,116 of A. H. Bobeck, U. F. Gianola, R. C. Sherwood, and W. Shockley, issued Aug. 5, 1969.

An alternative propagation technique involves the generation of reorienting fields in the plane of movement of domains. Such a technique employs an overlay of magnetically soft elements oriented with respect to one another to respond to a uniform in-plane field to generate changing magnetic pole patterns which attract domains to consecutive positions in a propagation channel.

The latter propagation technique is particularly useful for large capacity sequential memories such as disc files. In such arrangements, no electrical conductors are necessary except where a peculiar function is to be implemented locally. But advantage may be taken of the geometry of the magnetic overlay to build in certain functions without conductors. For example, a domain generator which avoids the necessity for electrical conductors is shown in copending application Ser. No. 756,210, filed Aug. 29, 1968 for A. J. Perneski now U.S. Pat. No. 3,555,527.

The overlay technique permits additional flexibility also. Such flexibility is demonstrated in copending application Ser. No. 038,124, filed May 18, 1970 for P. I. Bonyhard and I. Danylchuk. That application discloses a multistage shift register channel defined by overlay elements each of which circulates (or idles) a domain at each stage unless a next subsequent domain is present. The circulating domain is advanced one stage due to domain interaction when a subsequent domain is advanced. When the entire channel is filled, a subsequent domain causes a domain to be expelled from the opposite end of the channel much as an impact against the first of a line of touching billiard balls causes the last of the line to move. When operating in this mode, the register is called a "compressor" and each stage is called an "idler." Domain interaction thus is one important property for realizing flexibility of operation with overlay circuits.

Another important property is that all domain movement in such circuits is caused by pole patterns generated by the rotating in-plane field. Therefore, all movement is synchronous. The two properties, domain interaction and synchronous movement, are important tools in realizing a variety of advantages in accordance with this invention.

BRIEF DESCRIPTION OF THE INVENTION

Synchronous domain movement and domain interaction properties of domain devices are turned to advantage in one embodiment of this invention by a magnetically soft overlay having a geometry to move domains along first and second input channels and a first output channel in a slice of suitable material in response to a rotating in-plane field. The three channels meet at an intersection through which a domain in either input channel passes to the output channel in the absence of a domain moving synchronously in the other of the input channels, and through which no domain passes if a domain is present synchronously in both input channels.

The overlay defines a one cycle forced idler into which a domain from the first input channel in the latter instance is diverted. The idler is designed such that a diverted domain recirculates for only one cycle of the in-plane field and then passes to the intersection for passage to the output channel or for interaction with an associated domain moving synchronously along the second input channel as described above. A next subsequent domain in the first channel, however, forces the diverted domain back into the idler for an additional cycle. The one cycle forced idler performs the carry function, the three channels and the intersection functioning as a serial full adder.

DETAILED DESCRIPTION

Figure 1:
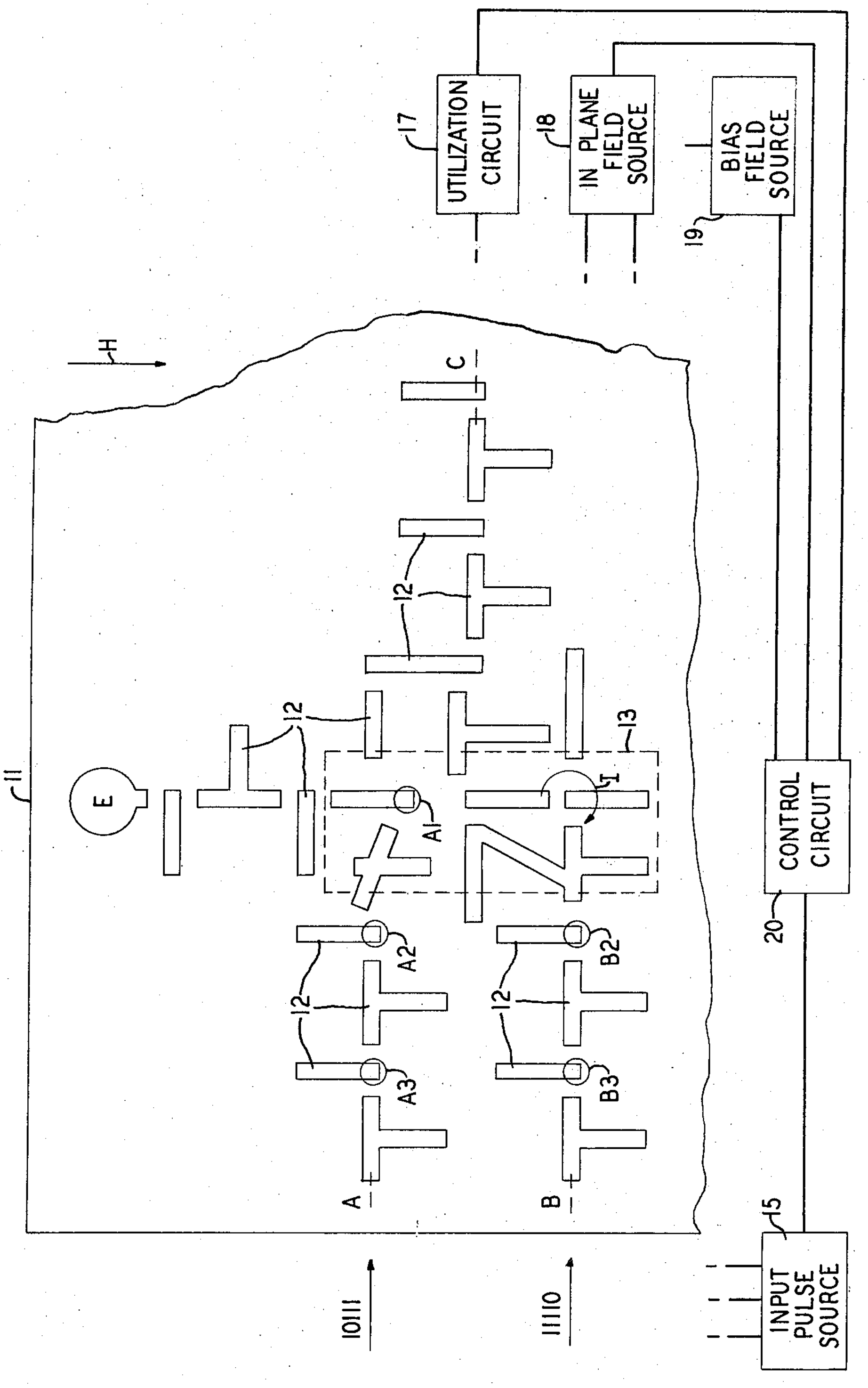
FIG. 1 is a schematic illustration of a domain logic arrangement in accordance with this invention.

FIG. 1 shows a sheet or slice 11 of material in which single wall domains can be moved. A pattern of overlay elements 12 define, illustratively, two input propagation channels A and B and one output channel C, interconnected at an intersection. The intersection is indicated by the broken line 13 in FIG. 1.

Domain patterns introduced to channels A and B at the left as viewed in FIG. 1 interact at the intersection to provide logic operations resulting in a domain pattern moving along channel C. An input pulse source suitable for generating domain patterns is well known and is represented herein by a block 15 in FIG. 1 without detailed description. Similarly, a suitable detector for domain patterns in channel C is represented by block 17 designated "utilization circuit".

The domains are moved in sheet 11 along the paths defined by the arrangement of overlay elements in response to a magnetic field rotating clockwise in the plane of the sheet in a manner now well understood. An in-plane field source for providing such a field is represented by block 18 in FIG. 1. Domains, so moved, are maintained at a nominal diameter by a familiar bias field, a source of which is represented by block 19 in FIG. 1.

Sources 15, 18, and 19 and circuit 17 are connected to a control circuit 20 for synchronization and activation.

The overlay geometry at the intersection 13 is designed to implement an addition of two binary numbers introduced to channels A and B. The operation is solely in response to the rotating in-plane field, the intersection responding to provide several alternative functions depending on the domain pattern synchronously introduced to the intersection and on the previous domain pattern.

The arrangement is particularly unique in that the intersection carries out a carry function familiar in addition operations. For this purpose, a one cycle idler position I is defined by the overlay at the intersection as shown in FIG. 1. A domain entering the idler circulates for only one cycle of the in-plane field unless another domain follows the circulating domain in channel B. The one cycle idler thus provides a temporary store which permits a delayed interaction with subsequent information, viz., the carry function.

The intersection also is designed so that a domain moving along channel A or B, in the absence of a domain moving synchronously in the other of the two channels, results in a domain moving synchronously into channel C. On the other hand, domains moving synchronously in both channels A and B (in the absence of a domain in the idler) result in no domain moving into channel C. Instead, the domain moving along channel A is annihilated at E in FIG. 1 and the domain in channel B is diverted to the one cycle idler for interaction with (or substition for) a next subsequent (or absent) domain in channel B. The idler is represented in FIG. 1 by the curved arrow I.

The operation of the intersection is most easily understood in terms of a series of illustrations, FIGS. 2–16, which show domain positions for a given pair of binary numbers as the in-plane field rotates. The numbers were selected to illustrate all possible permutations, 1–0, 0–1, 0–0, and 1–1 both with and without a prior carry operation. It will be seen that the result in channel C is the correct result of adding the two input members.

FIG. 1 shows the illustrative numbers 10111 and 11110 at the input of channels A and B respectively reading from right to left as shown in FIG. 1. The presence of a domain represents a binary one; the absence of a domain represents a binary zero. As the in-plane field rotates, domains representing the input information are moved synchronously to the right, as viewed in FIG. 1, occupying corresponding positions along the overlay in a well-known fashion. To simplify reference to consecutive figures, the domains representing the consecutive bits from right to left are designated by circles designated by the channel letter plus consecutive increasing numerals. For example, the first bit to the right in channel A of FIG. 1 is a binary one whereas the first in channel B is a binary zero. The former is represented by a circle A1 whereas the latter has an absent representation. The second bits, on the other hand, are both ones, represented by circles designated A2 and B2 for channels A and B, respectively.

The information, so represented, is moved to the right illustratively by a clockwise rotating in-plane field as stated above. In FIG. 1, the field is assumed to be directed downward as indicated by arrow H and the domains representing the first three bits of each input word occupy the positions shown there. The field rotates one full cycle and the domain pattern changes to that shown in FIG. 2 in response. Domain A1 moves normally into channel C, in this instance because there is no domain moving synchronously along channel B to deny domain A1 access to that channel.

Figure 2:
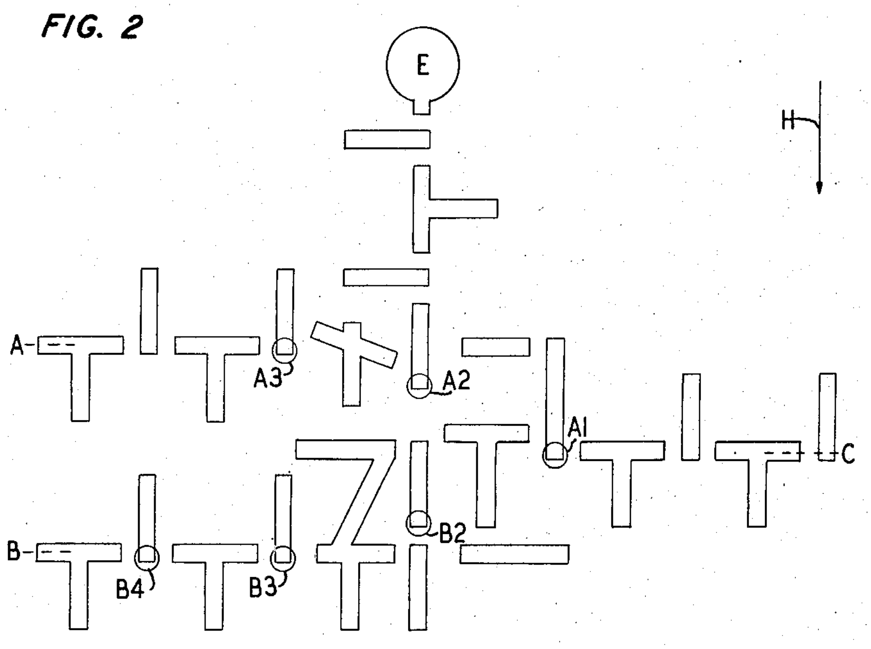
FIGS. 2–17 are schematic illustrations of portions of the arrangement of FIG. 1 showing consecutive magnetic conditions therein during operation.

A glance at FIG. 2 indicates that this is not the case for domains A2 and B2. The presence of the two domains denies channel C to both of them. Instead, the domains move to the positions shown for them in FIG. 3 when the in-plane field reorients to the left as shown by arrow H. Domain A2 will be seen to advance toward annihilator E in the figure whereas domain B2 will be seen now committed to the idler I at least for a single cycle of the in-plane field.

Figure 3:
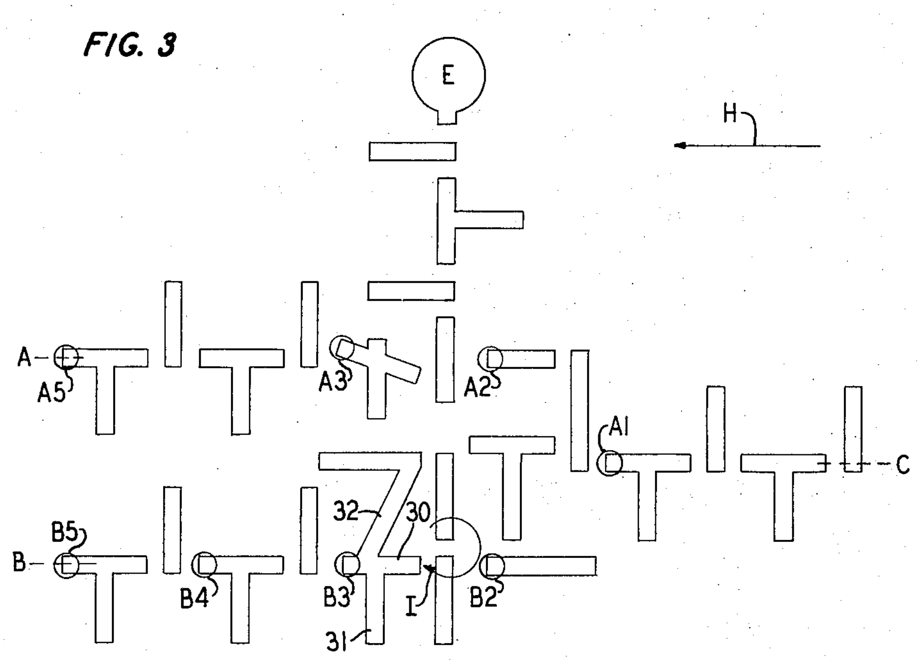
Figure 4:
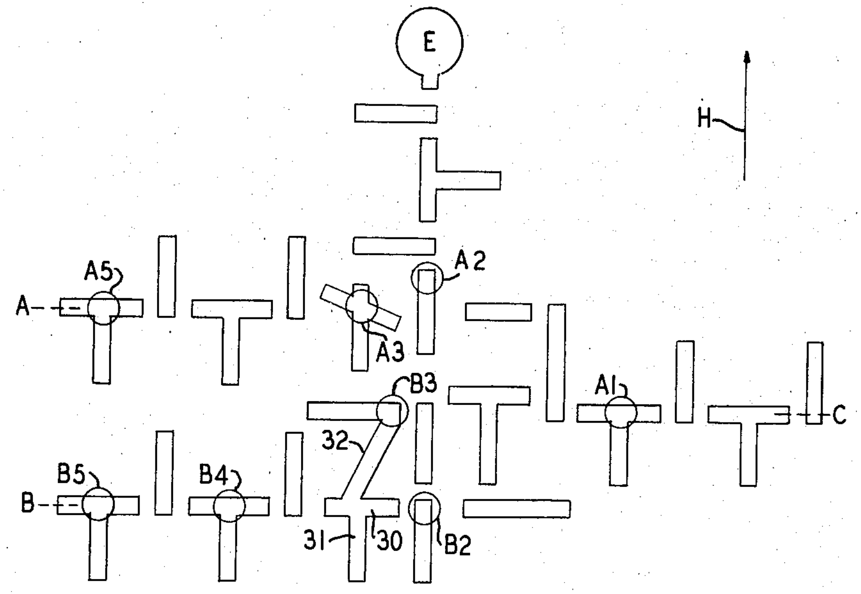

FIG. 4 shows arrow H, representative of the in-plane field, next rotated to the upward position. Domain A2 moves upward and domain B2 moves to the left as is clear from a comparison of FIGS. 3 and 4. The movement of domain B2 to the left denies position 30 of T-shaped element 31 to domain B3 of channel B. Consequently, domain B3 moves upward along portion 32 of element 31 as shown in FIG. 4.

Figure 5:
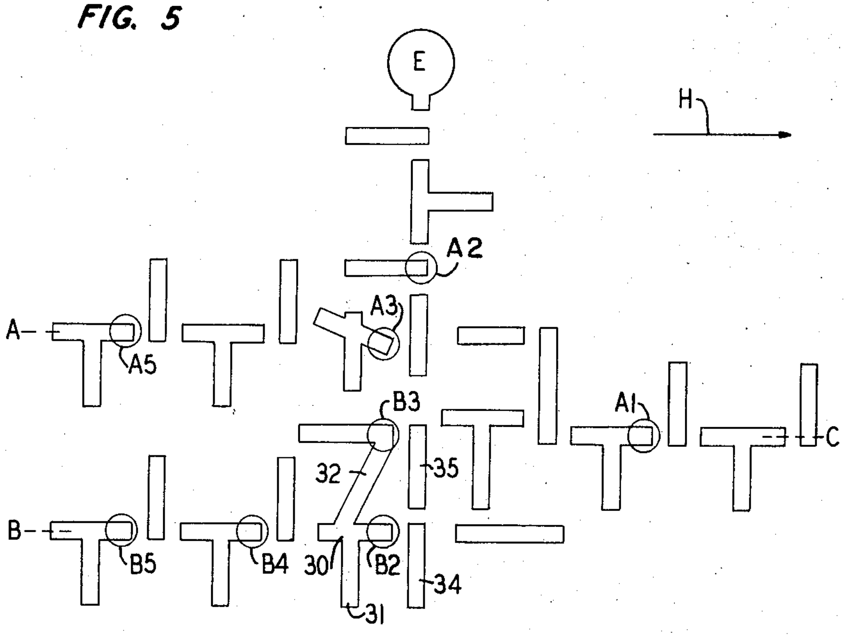
Figure 6:
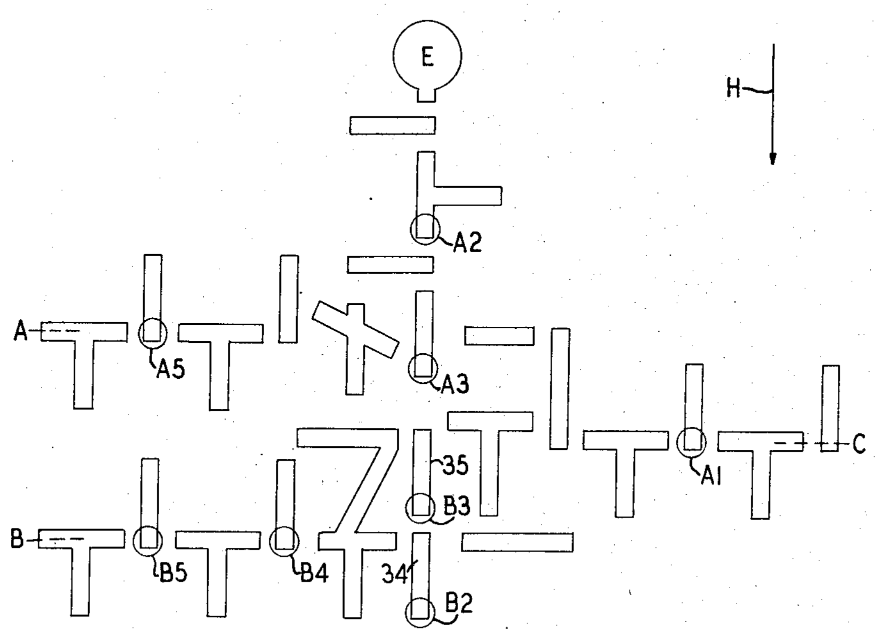

FIGS. 5 and 6 show the domain pattern as the in-plane field rotates to the right and then downward initiating another cycle. It is noted that domain B2 moves from a position to the right extremity of element 31 as shown in FIG. 5 to occupy a position at the bottom of element 34 of FIG. 6 rather than at the bottom of element 35. The latter position, its normal next idler position as shown in FIG. 2, being occupied by domain B3. This action will be seen to initiate a reversal in direction for domain B2 for one-half cycle of the in-plane field due to interaction with a next subsequent domain (B3).

Figure 7:
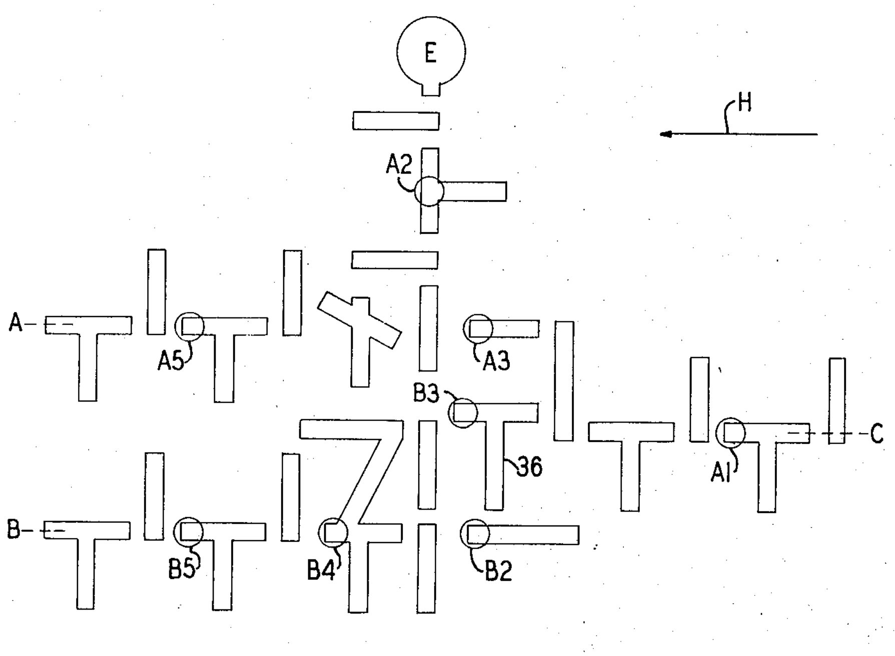

FIG. 7 shows the in-plane field rotated to the left as was the case in FIG. 3. Domains B2 and A3 occupy the positions previously occupied by domains B2 and A2 in FIG. 3. These domains are denied access to channel C as was the case previously. But domain B3 now advances along channel C as is clear from FIG. 8 as the in-plane field rotates to an upward position as shown there. The domains A2 and A3 proceed upward toward the annihilator E while the domain B2 is forced to continue to recirculate in the one cycle idler I.

It is helpful to compare FIG. 2 and FIG. 6 at this juncture. In the former instance, neither domain A2 or B2 moves to channel C because the interaction between the domains causes both to move to available alternative positions. In the instance of FIG. 6, however, the presence of a domain B2 in the idler inhibits movement of domain B3 into the idler as was the case previously for domain B2 as shown in FIG. 3. Instead, domain B3 is forced to move to the position shown on element 36 of FIG. 7 and thus is committed to subsequent movement along channel C. It is clear then that the domain in the idler modifies the operation shown for two domains A2 and B2 moving synchronously along channels A and B. In this manner, a one-cycle forced idler performs the carry function in the addition of the numbers represented to the left as viewed in FIG. 1.

Figure 8:
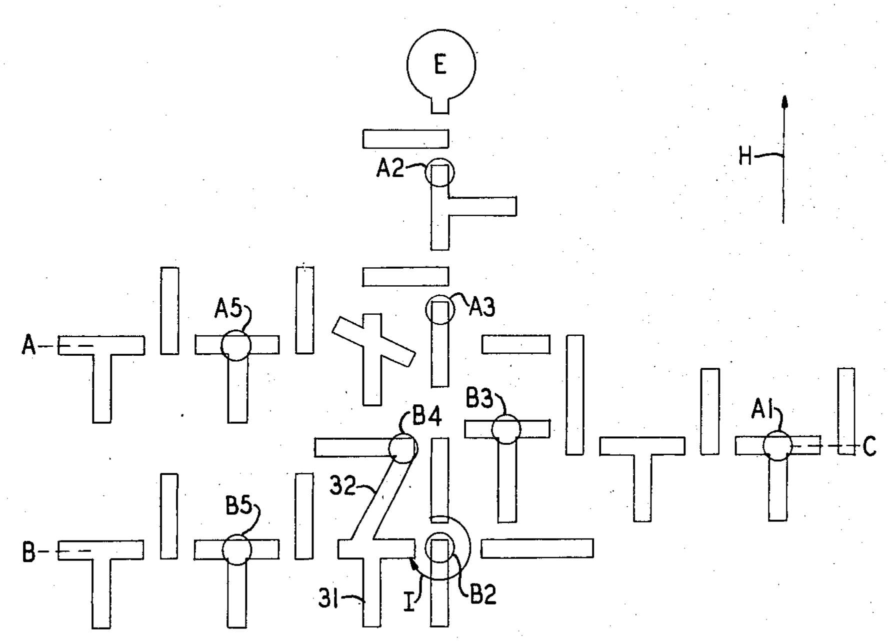
Figure 9:
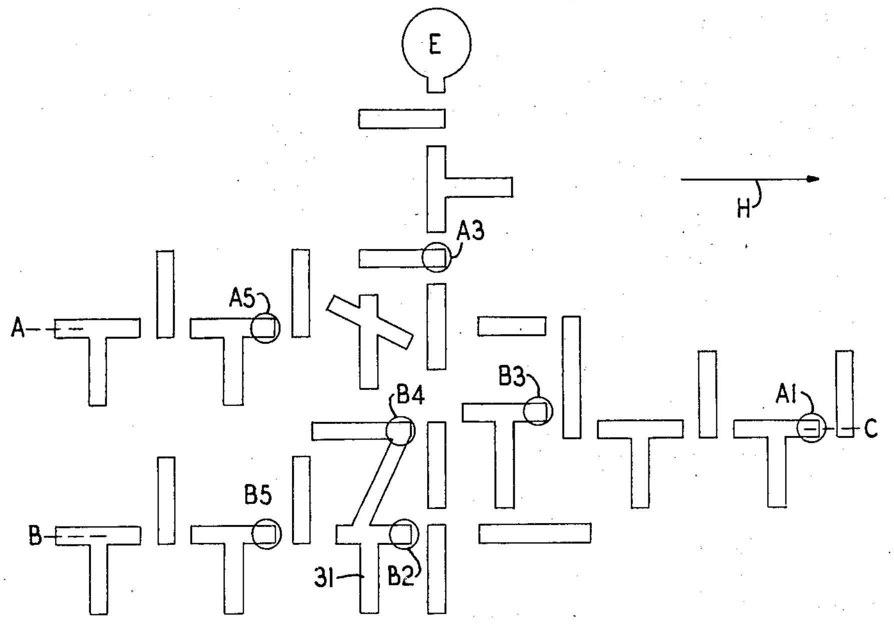
Figure 10:
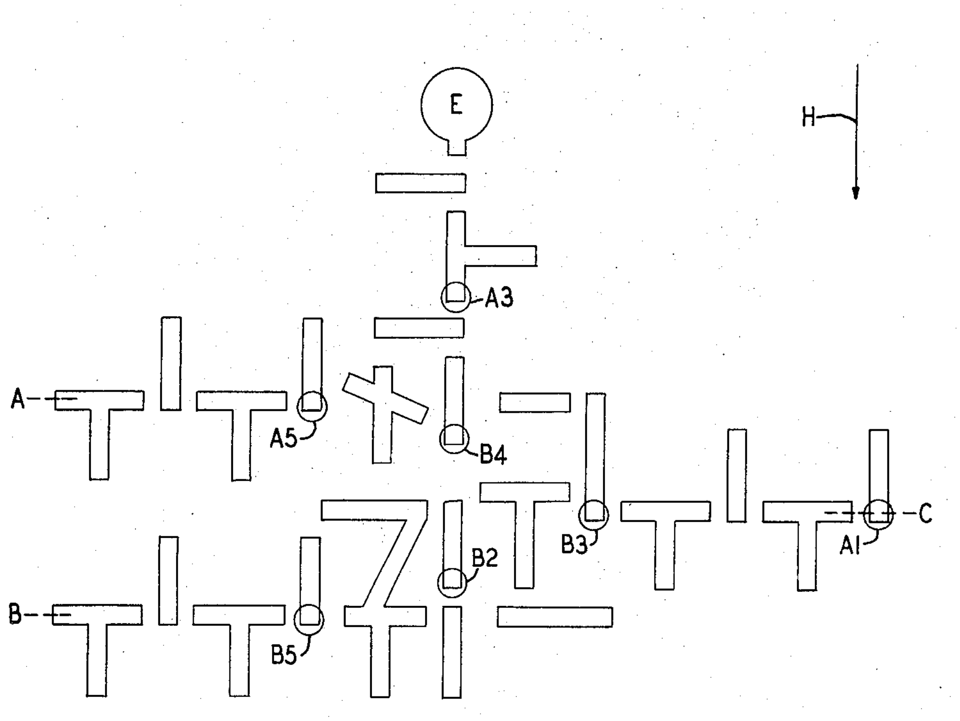
Figure 11:
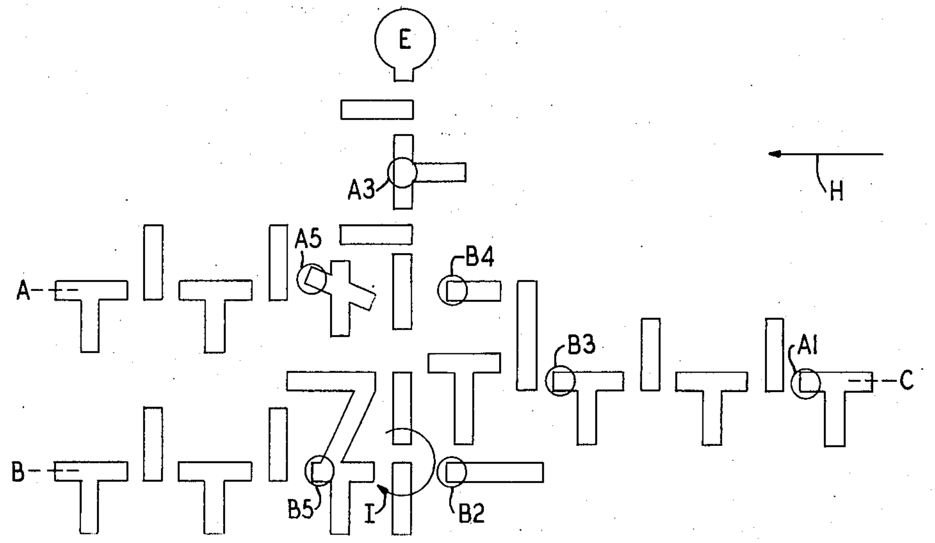

In FIGS. 8 and 9, domain B4 is shown moving along channel B along element 31 (portion 32) into the intersection in the absence of a domain moving synchronously in channel A. In FIG. 10, domain B2 in the idler and domain B4 occupy positions previously occupied by domains B2 and A2 in FIG. 2. As was the case with domains B2 and A2 in FIG. 3, domain B2 and domain B4 are similarly denied access to channel C when the in-plane field next reorients to the left as shown in FIG. 11. Domain B4 can be seen to be diverted upward into a path toward annihilator E and domain B2 is again diverted into the one cycle idler I.

Figure 12:
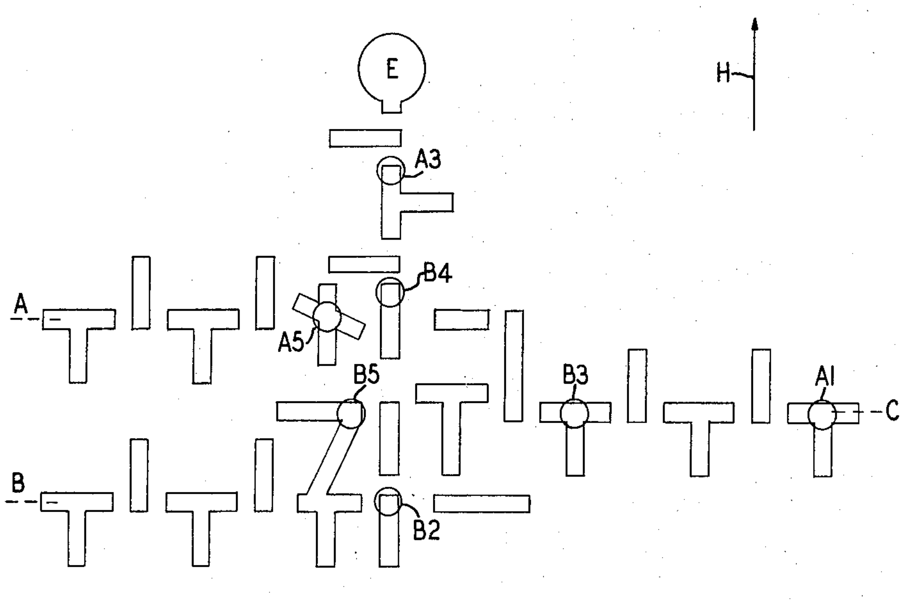
Figure 13:
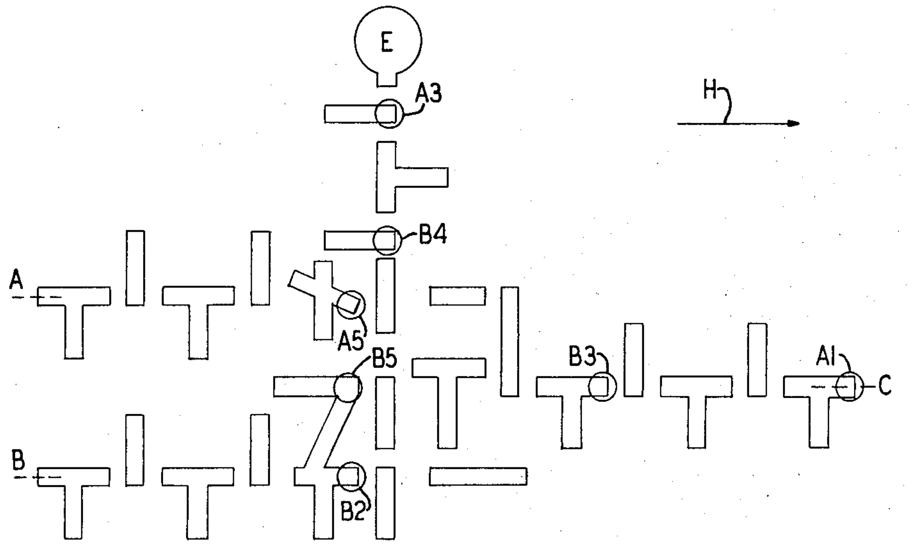
Figure 14:
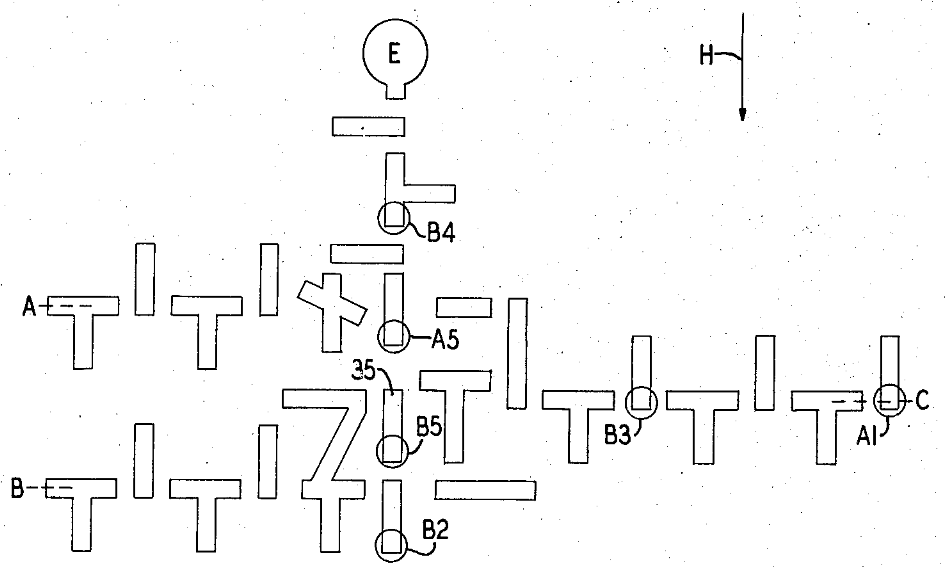

FIG. 12 shows domains A5 and B5 moving into the intersection, as did domains A3 and B3 in FIG. 4, when the in-plane field is next rotated to an upward position as indicated by arrow H in the figure. Once again, domain B2 is in the one-cycle idler and the sequence of FIGS. 5, 6, 7, and 8 repeats as shown in FIGS. 13, 14, 15, and 16.

Figure 15:
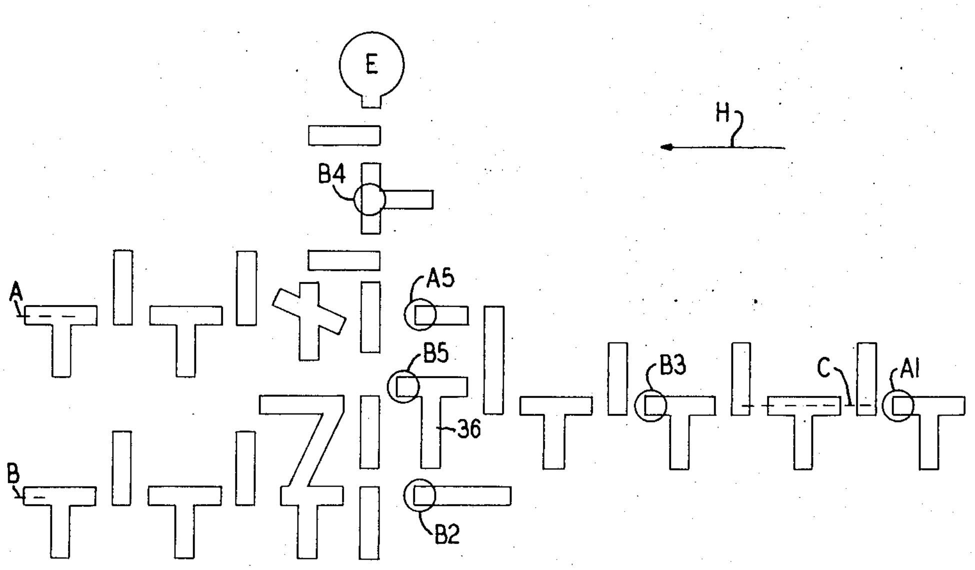
Figure 16:
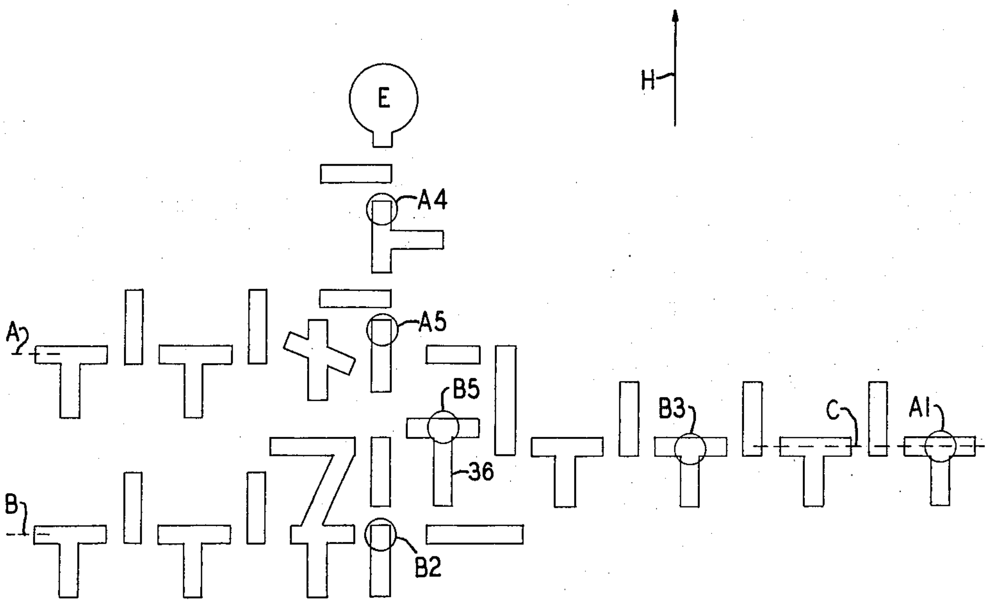
Figure 17:
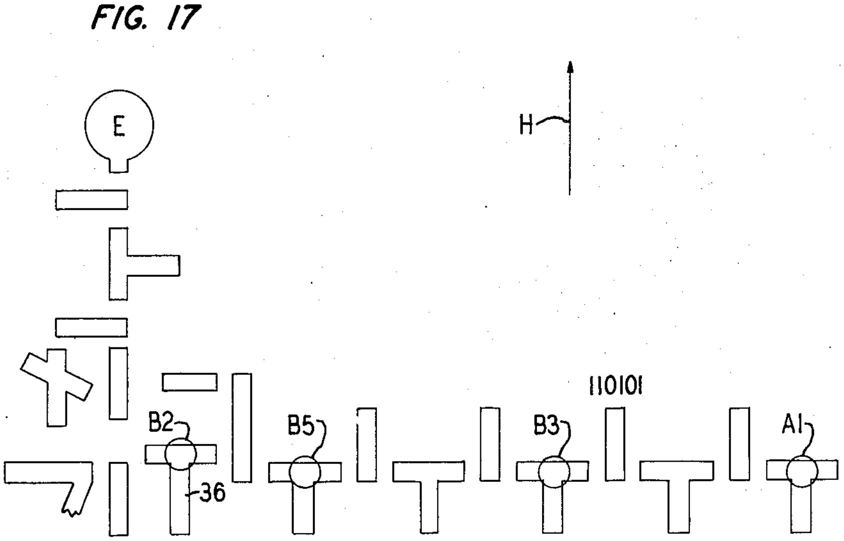

In the absence of additional information advancing along channels A and B, a 0–0 condition, domain B2 in the one-cycle idler is not forced to recirculate. As the in-plane field continues to rotate, domain B2 moves to the position of domain B5 at element 35 in FIG. 14 and thereafter to the position of domain B5 at element 36 as shown in FIG. 15. When the in-plane field is next directed upward, domain B2 moves to the position shown for domain B5 in FIG. 16 as shown in FIG. 17. The sum of the two input numbers can now be seen in channel C for movement to a detector. The number is shown in FIG. 17 as 101011 reading from right to left. This is the binary representation for the (decimal) number 53 and is the sum of the numbers, 23 and 30, represented by the binary notation beside channels A and B respectively.

The function performed by the overlay geometry at the intersection between two input channels and one output channel may be recognized as a serial adder. Particularly, when designed on garnet slices, overlay periods of about one-half mil are readily realizable. The arrangement shown in FIG. 1, accordingly, occupies about 3×6 mils and thus, most likely, would constitute only a small portion of a larger overlay designed for other functions, some of which could be employed to feed information into channels A and B, for example.

The illustrative overlay geometry is but one possible geometry for realizing the functions described. This geometry is designed for a clockwise rotating in-plane field and includes certain elements in offset positions (see FIG. 15, element 36) as well as peculiar or distorted elements (see element 31 in FIGS. 3 and 4) to effect the requisite domain movement. The considerations for designing a particular geometry for a given reorienting field are well understood in the art and, accordingly, the illustrative design is not explained in detail. Suffice it to say that the overlay is designed to generate magnetic pole patterns to attract domains to the consecutive positions shown in the figures and that alternative positions for domains are provided where possible domain interaction is expected to effect a choice between the positions. The lengths of the elements and their disposition otherwise are to control possible race conditions in the absence of domain interaction and to realized improved margins as is also well understood in the art.

What has been described is considered only illustrative of the principles of this invention. Therefore, modifications can be devised by those skilled in the art in accordance with those principles within the spirit and scope of this invention.

What is claimed is:

1. A domain propagation arrangement comprising a slice of material in which single wall domains can be moved, and a magnetically soft overlay juxtaposed with a surface of said slice for defining a first input domain propagation channel including an auxiliary recirculating loop for a domain and an output position, said overlay having a geometry at said recirculating loop to recirculate a domain only once thereabout in the absence of a control domain which inhibits movement of the recirculating domain to said output position, said domain in said loop being recirculated in response to a reorienting in-plane field, and second means for selectively diverting a domain from said first channel into said loop.

2. A domain propagation arrangement in accordance with claim 1 wherein said overlay also defines a second input propagation channel, said second channel intersecting said first channel such that a domain moving synchronously along said second channel is operative as said second means to divert a domain in said first channel to said loop.

3. A domain propagation arrangement in accordance with claim 2 wherein said overlay has a geometry such that a domain moving along said first input channel in the presence of a domain synchronously circulating in each of said second channel and said loop moves to said output position and is operative as said control domain to force said recirculating domain to recirculate once again thereabout in response to said in-plane field.

4. A domain propagation serial full adder comprising a slice of material in which single wall domains can be moved, a magnetically soft overlay juxtaposed with said slice for moving domains therein in response to a reorienting in-plane field, said overlay having a geometry to define first and second input channels and a first output channel having a common intersection, said overlay at said intersection having a geometry for defining an auxiliary recirculating loop for recirculating for only one cycle of said in-plane field any domain diverted thereto from said first channel.

5. A serial full adder in accordance with claim 4 wherein said overlay at said intersection also has a geometry for diverting domains moving synchronously along said first and second input channels to said recirculating loop and to a domain annihilator respectively.

6. A serial full adder in accordance with claim 5 wherein said overlay at said intersection has a geometry to pass a domain in either of said first or second input channels to said output channel in the absence of a domain moving synchronously along the other of said first or second input channels.

7. A serial full added in accordance with claim 6 wherein said overlay at said intersection also has a geometry to pass a domain in said first input channel to said output channel in the presence of domains moving synchronously in said second channel and in said recirculating loop.

8. A serial full adder in accordance with claim 7 wherein said in-plane field reorients by rotation, and means for providing said rotating in-plane field.

* * * * *